Patented Oct. 8, 1935

2,016,576

UNITED STATES PATENT OFFICE 2,016,576

TREATMENT OF OILS CONTAINING TERTIARY TERPENE ALCOHOLS AND PRODUCTS OBTAINED THEREBY

Robert C. Palmer and Paul O. Powers, Pensacola, Fla., assignors to Newport Industries, Inc., Pensacola, Fla., a corporation of Delaware No Drawing. Application August 16, 1933, Serial No. 685,414

11 Claims. (Cl. 260—153)

This invention relates to the preparation of dehydrogenation products obtainable from tertiary alcohols.

More specifically this invention relates to a process of treating tertiary terpene alcohols with sulfur to produce dehydrogenated alcohol products which may be readily dehydrated to form hydrocarbons. The invention also includes the novel products obtainable by the process.

In our copending application Serial No. 614,620 filed May 31, 1932 (now U. S. Patent No. 1,926,687, issued September 12, 1933), of which this application is a continuation-in-part, we have described and claimed the preparation of novel sulfurized terpene oil compositions obtainable by reacting sulfur with a terpene oil in the presence of an agent, such as an alkali, which combines with the sulfur to form a basic polysulfide. We have now found that if the reaction is continued until substantially all of the hydrogen sulfide is evolved, a dehydrogenation of the tertiray terpene alcohols occurs and that novel dehydrogenated alcohols are obtained which may be readily converted into novel terpene hydrocarbons by dehydration.

It is therefore an object of this invention to extend the reaction of sulfur on tertiary terpene alcohols as described in our U. S. Patent No. 1,926,687 until all of the hydrogen sulfide is evolved from the reacting mass to produce novel dehydrogenated products of the tertiary terpene alcohols.

Another object of this invention is to react tertiary terpene alcohols with sulfur in the presence of an agent which will form a basic polysulfide and continuing the reaction until all of the hydrogen sulfide is evolved whereby novel dehydrogenated products of the tertiary terpene alcohols are obtained.

Another object of this invention is to effect a dehydrogenation of tertiary terpene alcohols by reacting the same with sulfur and liberating sulfur from the reaction product in the form of hydrogen sulfide, whereby two atoms of hydrogen are removed from the tertiary alcohols so treated.

A specific object of this invention is to dehydrogenate alpha terpineol to form a novel product corresponding very closely to dihydrocuminic alcohol.

Another object of this invention is to dehydrate the product corresponding to dihydrocuminic alcohol obtainable by reacting alpha terpineol with sulfur and liberating sulfur from the reaction product in the form of hydrogen sulfide, said dehydration product being, most probably, a novel isomer of cymene.

Other and further objects of this invention will be apparent to those skilled in the art from the following specification and appended claims.

In our process, we may start with any tertiary terpene alcohol mixture or composition such as pine oil, terpineol and the like. For example, if pure alpha terpineol of the formula $C_{10}H_{17}OH$ is used as an initial material, the product of dehydrogenation has an empirical formula of $C_{10}H_{15}OH$ and corresponds very closely to dihydrocuminic alcohol such as is obtained from ginger grass oil. We have found, however, that the dehydrogenated terpineol of our invention is not identical with dihydrocuminic alcohol but, on the other hand, is apparently a heretofore unknown isomer of dihydrocuminic alcohol.

The following table shows how our dehydrogenated terpineol product compares with the dihydrocuminic alcohol obtainable from ginger grass oil:

|  | Dihydrocuminic alcohol | Dehydrogenation product of alpha terpineol |
| --- | --- | --- |
| Boiling point | 230° C. | 220° C. |
| Specific gravity at 15.5° C | .951 to .956 | .9507 |
| Index of refraction at 20° C | 1.4963 to 1.4971 | 1.493 |

Theoretically upon the dehydration of dihydrocuminic alcohol, the hydrocarbon cymene $(C_{10}H_{14})$ is obtained. We have found, however, that upon dehydration of our product we do not obtain a hydrocarbon having the characteristics of cymene although the empirical formula of our dehydrated product is $C_{10}H_{14}$. Most probably, therefore, the dehydrogenated alcohol is a novel isomer of dihydrocuminic alcohol, whereas the dehydrated hydrocarbon of our dehydrogenated alcohol is a novel isomer of cymene. The hydrocarbon has the following physical properties: Boiling point about 182° C., specific gravity at 15.5° C. .874, and index of refraction at 20° C. 1.488.

Therefore, the process of this invention differs from the process described and claimed in our U. S. Patent No. 1,926,687 in that instead of producing a sulfurized terpene oil composition containing substantially all of the tertiary alcohol groups present in the initial oil, we extend the reaction to form tertiary terpene alcohols containing two less hydrogens in the molecule.

These alcohols can be dehydrated to form novel terpene hydrocarbons containing two less hydrogens in the molecule than are normally present in dehydrated tertiary alcohols like those present in the initial material.

Our process, according to this invention, comprises heating a mixture of a tertiary terpene alcohol-containing oil, like terpineol or pine oil, and sulfur to temperatures about 160 to 200° C. in the presence of basic materials which form basic polysulfides with sulfur. Examples of such basic materials are sodium and potassium hydroxide, sodium and potassium carbonate, calcium hydroxide, triethanolamine, ammonium hydroxide and the like. The heat treatment is continued until substantially all of the hydrogen sulfide is evolved. The dehydrogenation is effected by the evolution of hydrogen sulfide.

Theoretically, in order to remove two hydrogen atoms from a tertiary terpene alcohol such as terpineol, the amount of sulfur required for the reaction would be about 20% of the tertiary terpene alcohol used. In actual practice, however, complete dehydrogenation is apparently not effected without some permanent sulfurization of the terpene alcohols since these tertiary alcohols are very readily reactive with sulfur. In practical operation, therefore, it is desirable to use a slight excess of sulfur over the theoretical quantity required so as to effect the complete removal of two hydrogen atoms from the tertiary terpene alcohols present. The use of a large excess of sulfur results in the production of a sulfurized oil.

The following example, in which parts by weight are indicated, illustrates a preferred specific embodiment of the process according to this invention as carried out with pine oil.

*Example 1*

To 100 parts of pine oil containing 70% of tertiary alcohols are added 15 to 17 parts of sulfur. The mixture is heated at temperatures between about 160 to 200° C. in the presence of about 0.1 part of soda ash until substantially all of the hydrogen sulfide given off during the reaction has been evolved. The reaction mass is next subjected to distillation, under reduced pressure, to separate the more volatile dehydrogenated terpene alcohol oil from any residual sulfurized oil. If desired an inert gas may be blown through the mass at atmospheric pressure to effect the separation.

In the above example, if it is desired to produce substantial quantities of a sulfurized terpene oil containing some of the original tertiary terpene alcohol groups in addition to the dehydrogenated tertiary terpene alcohols, larger amounts of sulfur may be used.

The dehydrogenated tertiary terpene alcohol oil which is separated from the residual sulfurized oil may be subjected to further chemical purification treatment to remove any sulfur compounds which were not separated by the first distillation. For example the oil may be washed with a caustic alkali solution at temperatures of about 100° C.

If desired, the oil may be further purified by treatment with metallic oxides which react with any sulfur present to form sulfides. The sulfides formed may be removed from the oil by distillation. Examples of suitable metallic oxides are copper, lead, zinc and iron oxides or the like.

If it is desired to dehydrate the dehydrogenated tertiary terpene alcohols as obtained in Example 1, two alternative methods may be followed.

For example, after the dehydrogenated alcohols have been produced in the original reaction mixture, the alkali present may be neutralized and the mass dehydrated by any known method of dehydrating tertiary terpene alcohol, for example by heating with 1 to 2% fuller's earth, 1 or 2% of graphite, 1 to 2% of iodine or with dehydrating mineral acids or acid salts or organic acids and anhydrides such as oxalic acid and acetic acid anhydride. Suitable dehydrating methods are also disclosed in U. S. Patents Nos. 1,463,122 and 1,593,030.

Alternatively the dehydration may be carried out on the final dehydrogenated terpene alcohol-containing oil as obtained after the distillation and/or purification treatments of the product formed in Example 1.

From the above description, it is apparent that we have produced novel terpene alcohols and hydrocarbons which are unknown to the prior art. The dehydrogenated products of our invention are well adapted for organic synthesis and may have wide and varied uses in industry in place of the materials from which they are obtained. Their increase in specific gravity and boiling point over the products from which they are obtained may represent an important feature in their industrial uses in the manufacture of rayon, lacquers, paints, varnishes, solvents and the like.

The dehydrogenation treatment changes the alcohols from the non-benzenoid to more nearly like the benzenoid structure and the products of our invention may, therefore, be used to better advantage than the alcohols from which they are obtained in cases where oxidation is to be avoided. For example in the rayon industry the use of pine oil causes an objectionable yellowing of the fibers due to the oxidation of pine oil substituents such as terpineol. Since our products are not readily oxidized they are valuable substitutes for pine oil.

We are aware that numerous details of the process may be varied through a wide range without departing from the principles of this invention, and we therefore do not purpose limiting the patent granted hereon otherwise than necessitated by the prior art.

We claim as our invention:

1. The process of preparing novel tertiary terpene alcohols, which comprises heating sulfur with a terpene oil containing tertiary terpene alcohols in the presence of an agent which will combine with sulfur to form a basic sulfide and continuing the heat treatment until substantially all of the hydrogen sulfide formed is evolved.

2. The process of preparing novel dehydrogenation products from tertiary terpene alcohols which comprises heating said alcohols with sulfur in the presence of an alkali until substantially all of the hydrogen sulfide formed is evolved.

3. The process of preparing an alcohol of the formula $C_{10}H_{15}OH$ from terpineol of the formula $C_{10}H_{17}OH$ which comprises heating the terpineol with sulfur in the presence of an alkali until substantially all of the hydrogen sulfide formed during the reaction is evolved.

4. The process of preparing dehydrogenated tertiary terpene alcohols from pine oil which comprises heating the pine oil with sulfur at temperatures between 160 to 200° C. until substantially all of the hydrogen sulfide formed during the reaction is evolved.

5. The process of preparing dehydrogenated tertiary terpene alcohols from the tertiary terpene alcohols present in pine oil which comprises heating said alcohols with about 20% of sulfur at temperatures between about 160 to 200° C. in the presence of an alkali capable of forming a basic sulfide and continuing said heat treatment until substantially all of the hydrogen sulfide formed has been evolved.

6. The process which comprises heating about 100 parts of pine oil containing about 70% of tertiary terpene alcohols with about 15 to 17 parts of sulfur at temperatures between 160 to 200° C. in the presence of about 0.1 part of soda ash until substantially all of the hydrogen sulfide formed during the reaction is evolved, subjecting the reaction product to distillation under reduced pressure and recovering a dehydrogenated terpene alcohol as the distillate.

7. The process of producing novel hydrocarbons from tertiary terpene alcohols which comprises reacting said alcohols with sulfur in the presence of an alkali at temperatures around 200° C. until substantially all of the hydrogen sulfide formed is evolved and dehydrating the dehydrogenated alcohols so formed.

8. The process of preparing hydrocarbons having an empirical formula of $C_{10}H_{14}$ from alpha terpineol which comprises heating the alpha terpineol with sulfur in the presence of an alkali until all of the hydrogen sulfide formed during the reaction is evolved and dehydrating the resulting dehydrogenated alcohol formed during the sulfur heat treatment.

9. An alcohol having an empirical formula of $C_{10}H_{15}OH$, a boiling point of about 220° C., a specific gravity of about .9507 at 15.5° C., and an index of refraction of about 1.493 at 20° C. and being most probably an isomer of dihydrocuminic alcohol.

10. An isomer of cymene having an empirical formula of $C_{10}H_{14}$, a boiling point of about 182° C., a specific gravity of about .874 at 15.5° C. and an index of refraction of about 1.488 at 20° C.

11. An isomer of dihydrocuminic alcohol having an empirical formula of $C_{10}H_{15}OH$, a boiling point of about 220° C. and a specific gravity of about .9507 at 15.5° C.

ROBERT C. PALMER.
PAUL O. POWERS.